United States Patent
Hamaguchi (10) Patent No.: US 7,787,821 B2
(45) Date of Patent: Aug. 31, 2010

(54) INFORMATION TERMINAL DEVICE, RADIO COMMUNICATION SYSTEM AND RADIO COMMUNICATION METHOD

(75) Inventor: Takayuki Hamaguchi, Takarazuka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 655 days.

(21) Appl. No.: 11/800,826

(22) Filed: May 8, 2007

(65) Prior Publication Data

US 2007/0265009 A1    Nov. 15, 2007

(30) Foreign Application Priority Data

May 10, 2006    (JP)    .............................. 2006-131313

(51) Int. Cl.
*H04B 5/00*    (2006.01)
(52) U.S. Cl. ...................... 455/41.1; 455/41.2; 455/436; 455/69; 455/574; 370/310; 370/329; 370/318
(58) Field of Classification Search ................ 455/41.1, 455/41.2, 436, 69, 574; 370/310, 329, 318
See application file for complete search history.

(56) References Cited

U.S. PATENT DOCUMENTS 7,574,216 B2 *    8/2009    Leitch et al. .............    455/456.1

2002/0113735 A1 *    8/2002    Spratt .......................... 342/464
2005/0233704 A1 *    10/2005    Maekawa ..................... 455/69
2006/0276161 A1 *    12/2006    Twitchell ................. 455/343.1

* cited by examiner

*Primary Examiner*—Sanh D Phu
(74) *Attorney, Agent, or Firm*—Brinks Hofer Gilson & Lione (57) ABSTRACT

An information terminal device (terminal) has a first radio communication unit capable of performing radio communication with low power consumption and a second radio communication unit performing data communication using a wireless LAN. In an ad-hoc mode in which data communication is performed between the terminals, as a rule, the second radio communication unit is set in a sleep mode. However, when actual data communication is necessary, an activation signal is transmitted to a terminal as a communication party by using the first radio communication unit to activate the second radio communication unit. After completion of data communication, a stop signal is transmitted to the terminal as the communication party by using the first radio communication unit to stop the second radio communication unit on the transmission side. In such a manner, transmission of a beacon signal from the second radio communication unit is suppressed, and proper power saving is realized.

13 Claims, 8 Drawing Sheets

INFORMATION TERMINAL DEVICE, RADIO COMMUNICATION SYSTEM AND RADIO COMMUNICATION METHOD

This application is based on application No. 2006-131313 filed in Japan, the content of which is hereby incorporated by reference.

BACKGROUND OF THE INVENTION

1. Field of the Invention

The present invention relates to the technique of an information terminal device having a display.

2. Description of the Background Art

In data communication of an information terminal device, as radio communication infrastructure develops, downloading of information via an access point such as a hot spot (radio spot) became possible also in a portable information terminal, and information terminals are connected by radio and share information.

In the case where it is difficult to supply power from an external power supply at the time of performing radio communications in a portable information terminal, power is supplied from an internal power supply such as a built-in battery. In such a case, it is important to increase the life of the battery or the like by saving power (lowering power) of radio communication. In particular, in the case of connecting information terminals in an ad-hoc mode by using a wireless LAN, it is necessary to transmit a beacon signal for recognizing the existence of a communicable terminal, so that power consumption increases.

With respect to the radio communication in the ad-hoc mode, for example, there is a power saving technique disclosed in Japanese Unexamined Patent Application Publication No. 2005-328515. According to the technique, in the case where an information terminal receives a beacon signal for a sleep mode, the information terminal enters the sleep mode. After lapse of a predetermined sleep period, each of the information terminals is activated again by a timer process, communication restarts, and the operations are repeated. By such operations, connection between information terminals is established in predetermined cycles. Consequently, the number of transmitting times of the beacon signal accompanying considerable power consumption decreases, and power saving is achieved.

In the technique of Japanese Unexamined Patent Application Publication No. 2005-328515, however, the beacon signal for establishing connection between the information terminals is transmitted periodically and, in some cases, the beacon signal is transmitted even when data communication is unnecessary. It cannot be said that power consumption is effectively made in radio communication between information terminals.

SUMMARY OF THE INVENTION

The present invention is directed to an information terminal device having a display.

According to the invention, the information terminal device having a display has: (a) a data communication unit capable of switching between an active state and an inactive state and performing radio data communication with another information terminal device; (b) a low-power communication unit capable of performing radio communication with the another information terminal device with power consumption smaller than that of the data communication unit; and (c) a controller which sets the data communication unit to the inactive state except for a communication process period in which process necessary for the data communication is performed. Start timing and/or end timing of the communication process period can be obtained by the low-power communication unit. With the configuration, proper power saving can be realized when radio data communication is performed between information terminals.

In a preferred embodiment of the invention, in the information terminal device, in the case where a predetermined radio signal transmitted from the low-power communication unit of the another information terminal device is received by the low-power communication unit, the controller determines that it is the start timing of the communication process period and sets the data communication unit to the active state. Consequently, the data communication unit can be made active at a good timing, and power saving can be achieved more properly.

The present invention is also directed to a radio communication system and a radio communication method.

Therefore, an object of the present invention is to provide a technique of an information terminal device realizing proper power saving when radio data communication is performed between information terminals.

These and other objects, features, aspects and advantages of the present invention will become more apparent from the following detailed description of the present invention when taken in conjunction with the accompanying drawings.

DESCRIPTION OF THE PREFERRED EMBODIMENTS

Outline of Information Terminal Device

Figure 1:
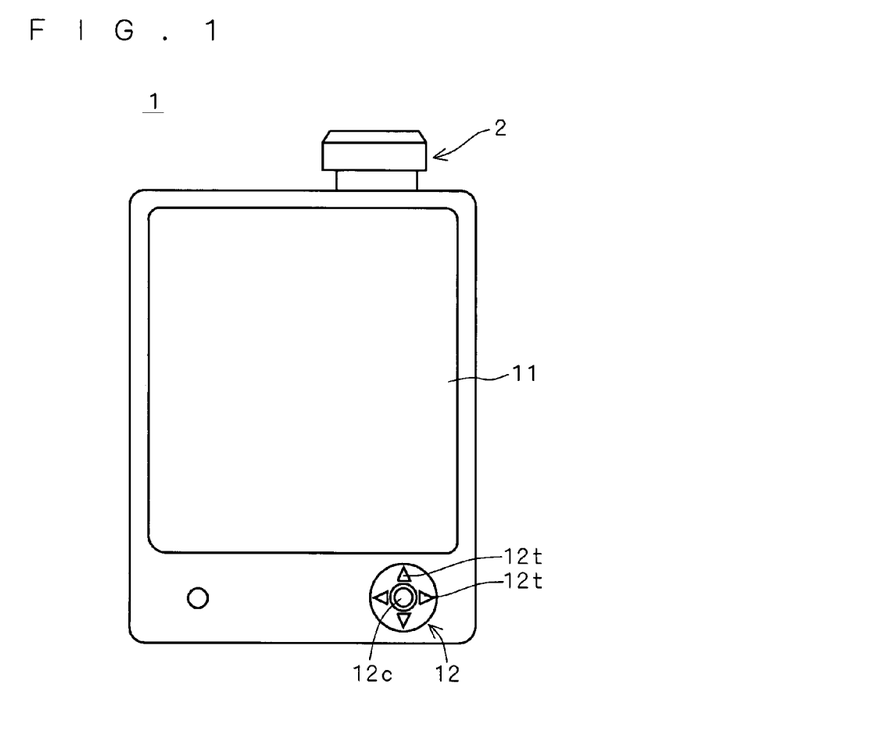
FIG. 1 is an appearance diagram showing the configuration of main components of an information terminal device according to an embodiment of the invention.

FIG. 1 is an appearance diagram showing the configuration of main components of an information terminal device 1 according to an embodiment of the invention, and is a front view of the information terminal device 1.

The information terminal device (hereinbelow, simply called "terminal") 1 has a display 11, an operation unit 12, and a radio unit 2.

The display 11 can display image data and is constructed as a display device having a nonvolatile memory characteristic.

As the display device having a memory characteristic concerning a display (state), for example, a display device can be used having a ferroelectric liquid crystal display element, an anti-ferroelectric liquid crystal display element, a ferroelectric polymer liquid crystal display element, a cholesteric liquid crystal display element using chiral nematic liquid crystal showing a cholesteric liquid crystal phase at room temperature or the like, an electrochromic display element, a display element having electrophoresis cells, a particle moving type display element in which dry powders are enclosed in a substrate and moved by an electric field, thereby displaying an image, a display element for displaying an image by precipitation and dissolution of silver, a display element having a twist ball, or the like. In the display device, drawing of data completes by a single scan. After that, the display device can maintain display substantially permanently even in a state where application of an energy such as electric field from the outside is stopped. Thus, electric power saving can be realized.

The operation unit 12 is a part for receiving an operation input from the user, and has a circular switch 12c and four triangular switches 12t disposed around the switch 12c. For example, by the user operation on the switch 12t, the screen displayed on the display 11 can be scrolled.

The radio unit 2 has therein, for example, an antenna and is constructed as a module for performing radio communication of a wireless LAN or the like with other terminals.

Figure 2:
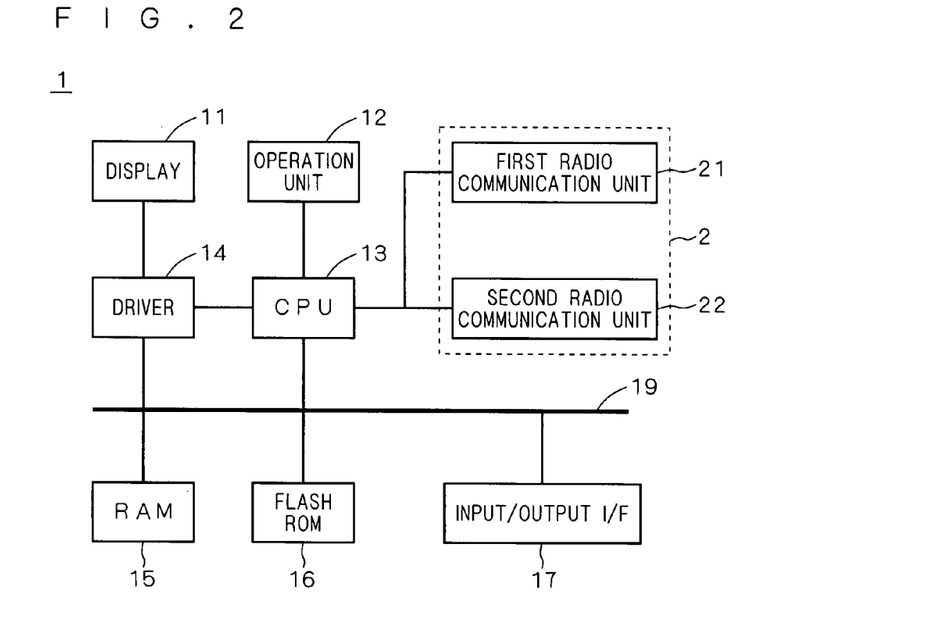
FIG. 2 is a block diagram showing the configuration of main components of the terminal.

FIG. 2 is a block diagram showing the configuration of main components of the terminal 1.

The terminal 1 has a CPU (Central Processing Unit) 13 electrically connected to the operation unit 12 and the ratio unit 2, and a driver (controller) 14 for driving the display 11 on the basis of a signal from the CPU 13. The terminal 1 has a RAM 15, a flash ROM 16, and an input/output interface (I/F) 17 which are connected to the CPU 13 and the like via a data bus 19 so that data can be transmitted.

The RAM 15 is constructed as, for example, an SDRAM and stores image data displayed on the display 11, work data used at the time of executing a program, and the like.

The flash ROM 16 is constructed as a nonvolatile memory and stores a program or the like executed by the CPU 13.

The input/output I/F 17 is an interface for transmitting/receiving data to/from the outside via, for example, a USB terminal or a slot of a memory card.

The radio unit 2 has a first radio communication unit 21 and a second radio communication unit 22.

The second radio communication unit 22 functions as data communication part for performing data communication by radio with other terminals. The second radio communication unit 22 is constructed, for example, as a radio communication device for a standardized wireless LAN conformed to the IEEE802.11 standard. The second radio communication unit 22 can perform radio communication at higher speed and with larger capacity as compared with the first radio communication unit 21. The second radio communication unit 22 can switch between an active mode and a sleep mode (non-active mode) for power saving. In response to a trigger signal or the like from the outside, the second radio communication unit 22 can perform a resume process from the sleep mode (suspend mode) and enter the active mode (running mode).

The first radio communication unit 21 functions as low power communication part capable of performing radio communication with another terminal by using power consumption less than that of the second radio communication unit 22. The first radio communication unit 21 is constructed as a low-power-consumption type short-range radio device conformed with, for example, the ZigBee (trademark) standard.

The first radio communication unit 21 outputs a trigger signal (which will be described in detail later) for activating or suspending the second radio communication unit 22. Since the first radio communication unit 21 is a short-range radio device, the range in which radio waves reach, that is, the communication distance is, for example, 100 meters or less. The communicatable range is narrower than that of the second radio communication unit 22.

By the radio unit 2 having the configuration as described above, in the case where the second radio communication unit 22 is being suspended (or stopped), a signal (activation signal) from another terminal 1 which is going to perform data communication can be received by the first radio communication unit 21 and the second radio communication unit 22 can be activated. After completion of data communication using the second radio communication unit 22, a signal (stop signal) for notifying the terminal on the other side of completion of data communication, and the second radio communication unit 22 on the other side can be suspended (or stopped). In such a manner, without changing the standardized communication procedure (logic) of the second ratio communication unit 22, the second radio communication unit 22 is activated and data communication is performed as necessary. Thus, the running time of the second radio communication unit 22 whose power consumption is relatively large is minimized, and power can be saved (which will be described in detail later).

The CPU 13 is a part for controlling the components of the terminal 1 in a centralized manner by executing a program or the like stored in the flash ROM 16.

The operation of the radio communication system having a plurality of terminals 1 each having the above configuration will be described in detail hereinbelow.

Figure 3:
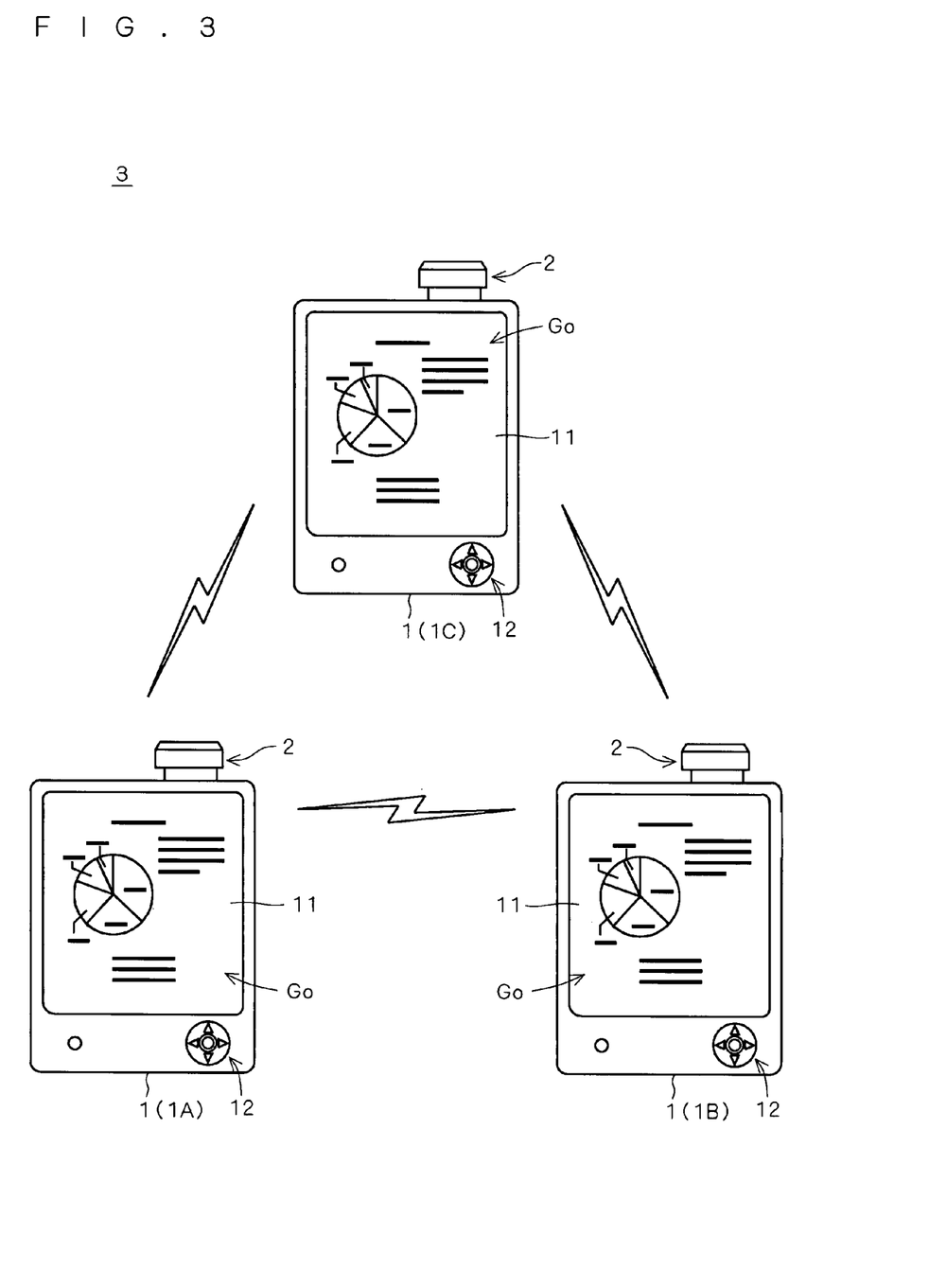
FIG. 3 is a diagram showing a radio communication system having a plurality of terminals.

FIG. 3 is a diagram showing a radio communication system 3 having a plurality of terminals 1 (1A, 1B, and 1C).

In the case of performing data communication directly between terminals via the wireless LAN, an ad-hoc mode of periodically transmitting a beacon signal for letting the other parties know the existence is set. When a beacon signal transmitted from another terminal is detected and the existence of a communicable terminal is recognized, a probe request for inviting the another terminal to the network is transmitted. When a positive probe response indicative of the intention of participation in the network is received in response to the request, a wireless network is formed, and data communication is performed.

In the radio communication in the ad-hoc mode, the beacon signal has to be periodically transmitted. There is consequently a drawback such as large power consumption accompanying the signal transmitting operation.

Figure 4:
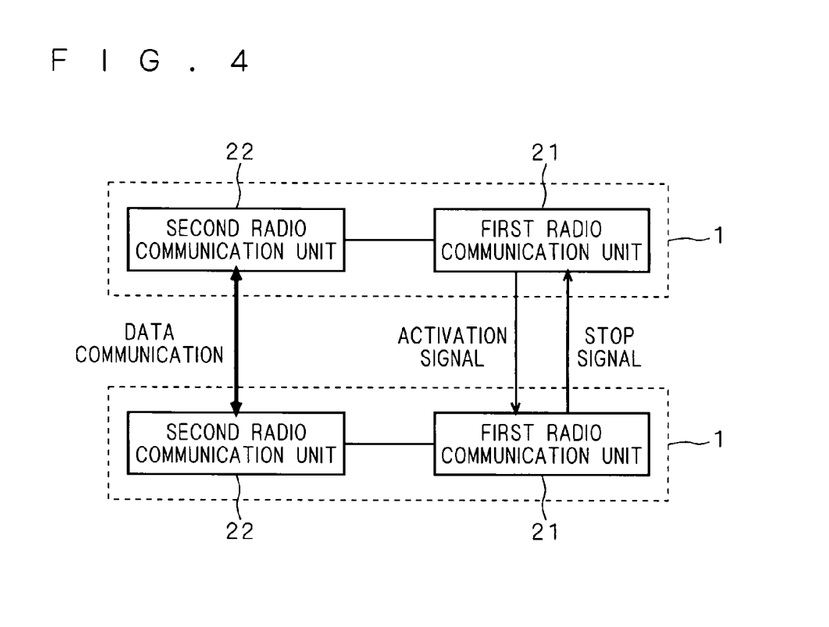
FIG. 4 is a diagram illustrating the function of a first radio communication unit.

To solve the drawback, in the terminal 1 of the embodiment, by providing not only the second radio communication unit 22 capable of performing data communication in the ad-hoc mode as shown in FIG. 4 but also the first radio communication unit 21 of the low power consumption type for controlling the timings of activating and suspending the second radio communication unit 22, the second radio communication unit 22 is made active only in the case where data communication is actually necessary, thereby suppressing transmission of the beacon signal from the second radio communication unit 22.

Figure 5:
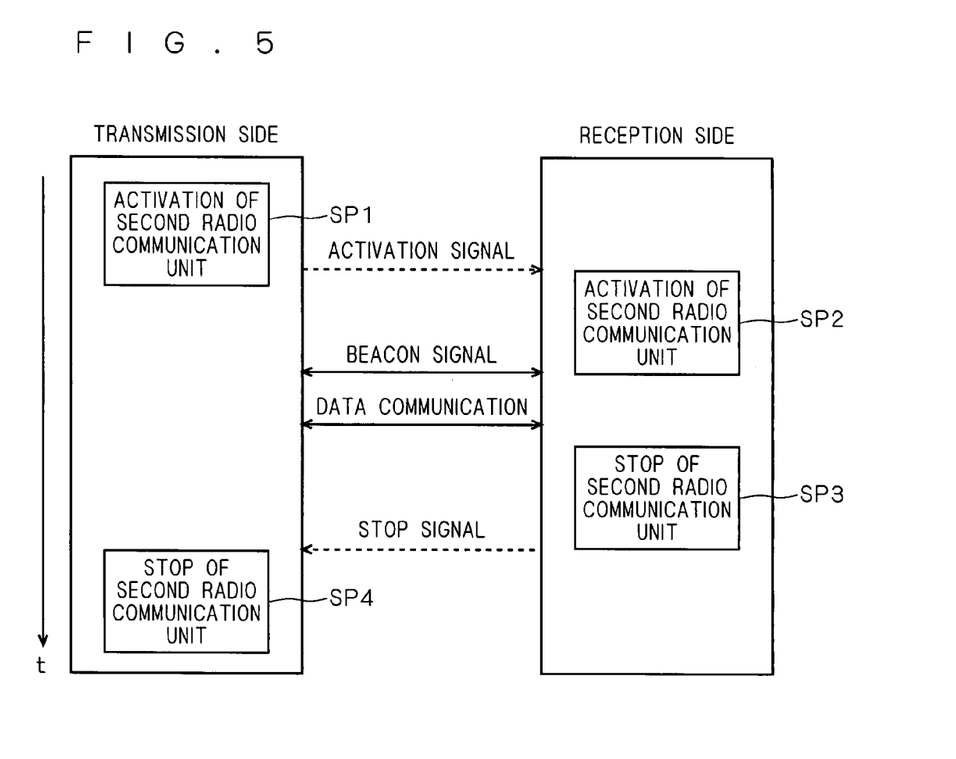
FIG. 5 is a diagram illustrating the operation of the terminal.

The operation of the terminal 1 of the embodiment will be concretely described with reference to FIG. 5. In FIG. 5, it is assumed that time "t" elapses from top to down, and operations performed in the case where data communication is performed between two terminals by using a wireless LAN, concretely, operations performed in the case of transmitting data from the terminal 1 on the transmission side to the terminal 1 on the reception side are shown.

First, in the terminal 1 on the transmission side, for example, the user operates the operation unit 12 to activate the second radio communication unit 22 set in the sleep mode (step SP1).

Next, the terminal 1 on the transmission side sends an activation signal for activating the second radio communication unit 22 on the reception side from the first radio communication unit 21. The terminal 1 on the reception side which receives the activation signal by the first radio communication unit 21 activates the second radio communication unit 22 (step SP2).

The terminals 1 on the reception and transmission sides with the second radio communication units 22 activated transmit the beacon signals to form a wireless LAN and perform data communications by radio.

After completion of the data communications, the terminal 1 on the reception side sets the second radio communication unit 22 in the sleep mode to suspend it, and prepares for the next data communication (step SP3). From the first radio communication unit 21 on the reception side, a stop signal for making the second radio communication unit 22 on the transmission side inactive is transmitted.

The terminal 1 on the transmission side which receives the stop signal by the first radio communication unit 21 sets the second radio communication unit 22 in the sleep mode to suspend it, and prepares for the next data communication (step SP4).

By executing the operations as described above in the terminals 1, in a manner similar to the conventional radio communication in the ad-hoc mode, for example, an image Go displayed on the display 11 of a terminal 1A on the transmission side can be displayed on the displays 11 of terminals 1B and 1C on the reception side (FIG. 3). Further, in each terminal 1, by receiving the activation signal and the stop signal transmitted from the other terminals by the first radio communication unit 21, start and end timings of a period for performing processes necessary for actual data communication (hereinbelow, called "communication process period") are obtained. Consequently, the second radio communication unit 22 can be set in the sleep mode except for the communication process period. As a result, transmission of beacon signals by the second radio communication unit 22 is minimized, and the power consumption can be reduced.

Operations in Terminals 1 in Radio Communication System 3

In the following, the operations at the time of performing data communications in the ad-hoc mode in the radio communication system 3 (FIG. 3), specifically, concrete operations performed at the time of transmitting data from the terminal 1A to the terminal 1B will be described.

Figure 6:
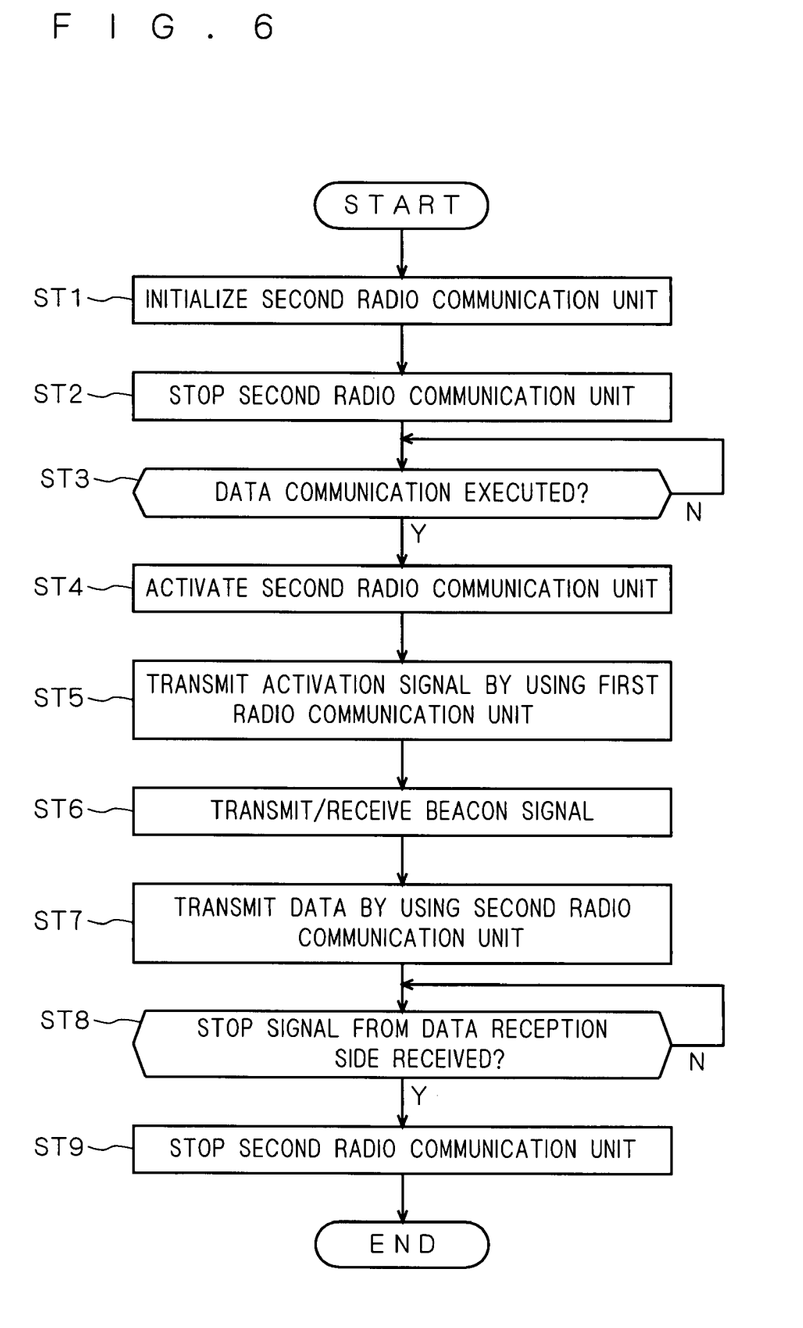
FIG. 6 is a flowchart showing basic operation of a terminal on a data transmission side.
Figure 7:
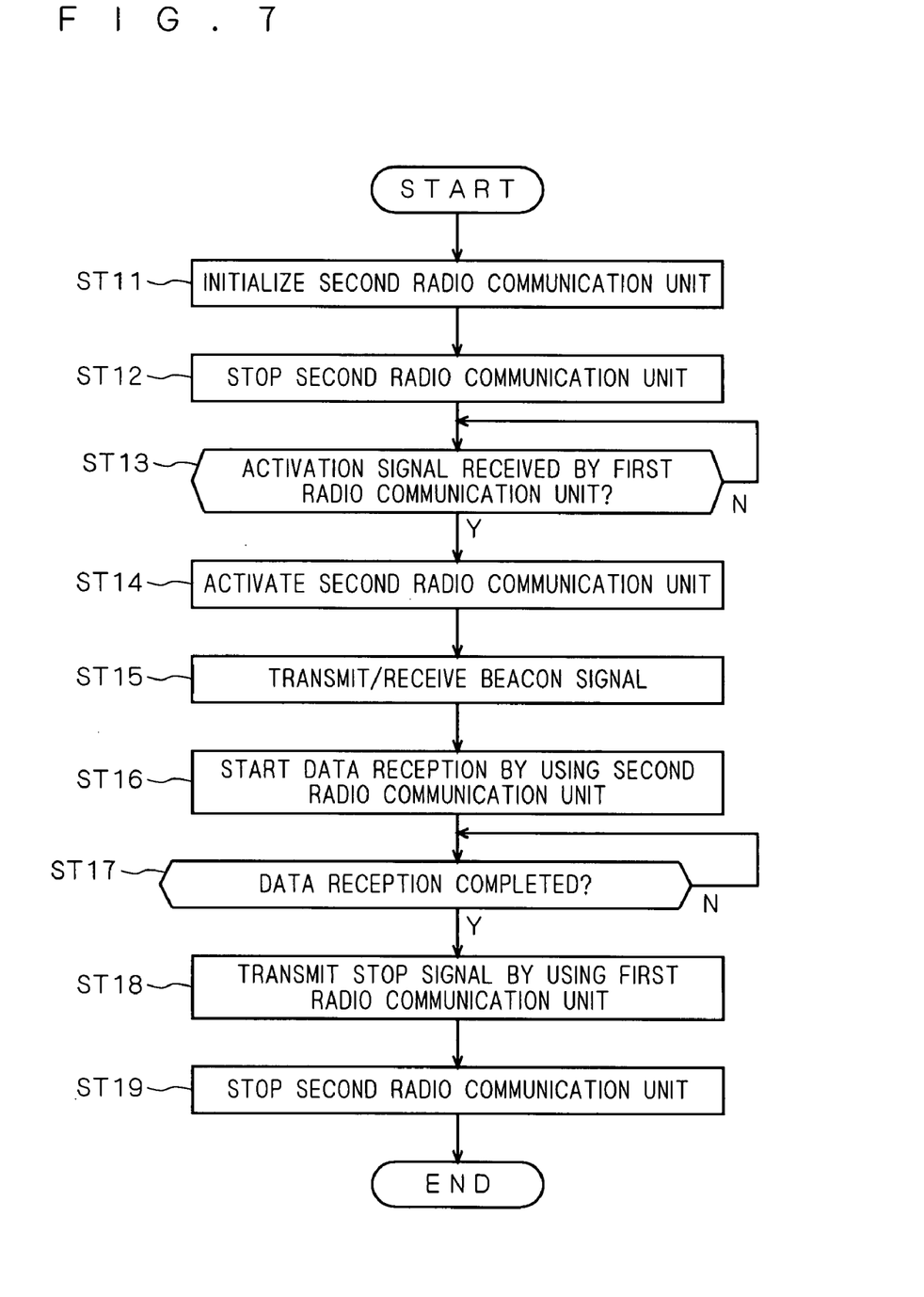
FIG. 7 is a flowchart showing basic operation of a terminal on a data reception side.

FIG. 6 is a flowchart showing basic operation of the terminal 1A on the data transmission side. FIG. 7 is a flowchart showing basic operation of the terminal 1B on the data reception side.

First, the operation of the terminal 1A will be described with reference to FIG. 6.

In step ST1, for example, in response to power-on by the user, the second radio communication unit 22 is initialized.

In step ST2, the components of the terminal 1A including the second radio communication unit 22 and the CPU 13 are set in the sleep mode and suspended for saving power. The first radio communication unit 21 is set in a standby mode (for example, waiting mode) in which radio signals from the other terminals can be received, thereby setting a minimum power consumption state.

Figure 8:
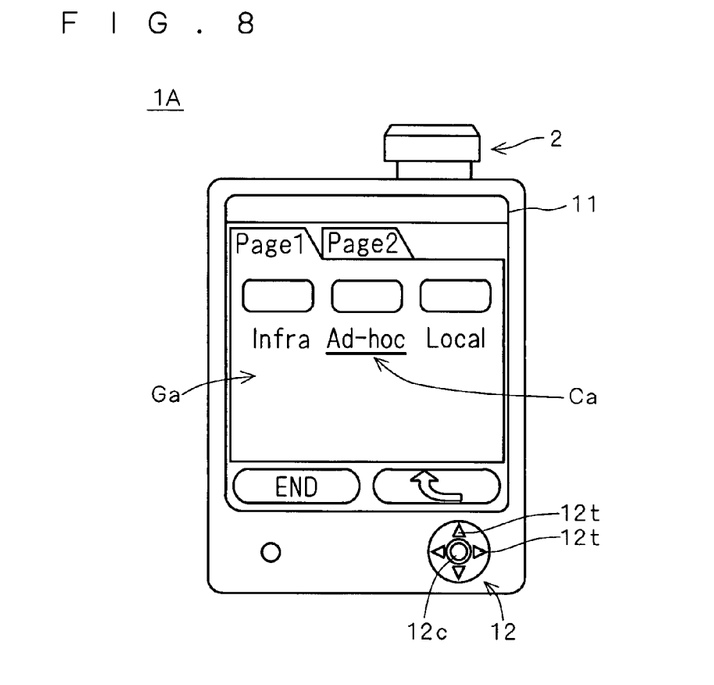
FIG. 8 is a diagram showing the operation of the terminal on the data transmission side.

In step ST3, whether data communication between terminals is executed or not is determined. For example, as shown in FIG. 8, a GUI screen Ga is displayed on the display 11 of the terminal 1A, and whether "Ad-hoc" (ad-hoc mode) Ca is selected and executed by a user operation on the operation unit 12 or not is determined. In the case where the user desires to use a wireless LAN in an infrastructure mode in the GUI screen Ga, "Infra" is selected. In the case where the user desires to view data stored in the terminal 1, "Local" is selected.

When it is determined in step ST3 that data communication is performed, the program advances to step ST4. In the case where data communication is not performed, the terminal 1A repeats the process in the step ST3.

In step ST4, by performing resume process, the second radio communication unit 21 set in the sleep mode is activated. Specifically, in response to an operation input of the user on the operation unit 12, the second radio communication unit 22 is set in the active state.

In step ST5, by using the first radio communication unit 21, an activation signal (trigger signal) for activating the second radio communication unit 22 in another terminal 1 is transmitted. In the terminal 1 which receives the activation signal by its first radio communication unit 21, for example, the terminals 1B and 1C (refer to FIG. 3), the second radio communication unit 22 is activated.

Figure 9:
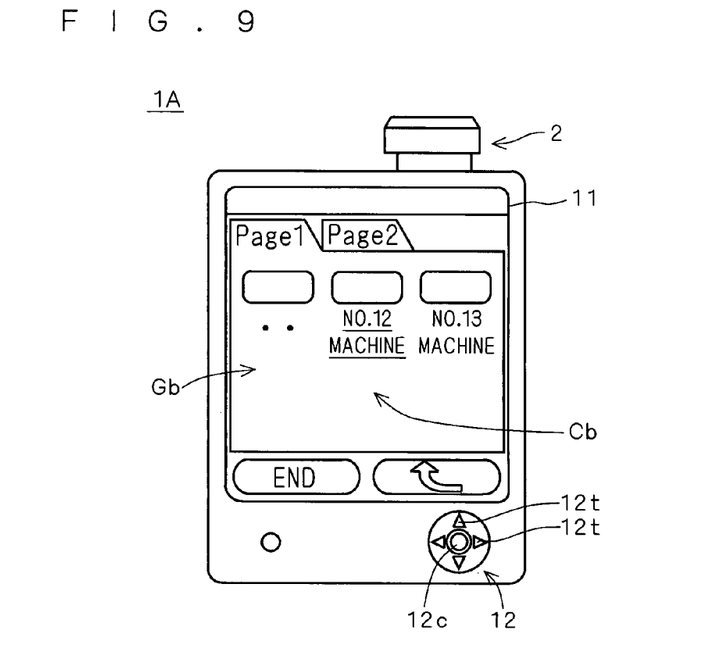
FIG. 9 is a diagram showing the operation of the terminal on the data transmission side.

In step ST6, beacon signals for establishing network connection are transmitted/received among the terminals 1B and 1C whose second radio communication units 22 are activated in response to the activation signal transmitted in step ST5, and the terminal 1A, thereby forming a wireless LAN. Consequently, for example, a GUI screen Gb showing the identification name "No. 12 machine" of the terminal 1B and the identification name "No. 13 machine" of the terminal 1C is displayed on the display 11 of the terminal 1A as shown in FIG. 9. The user of the terminal 1A can recognize the existence of the terminals 1B and 1C connected to the terminal 1A via the wireless LAN.

In step ST7, the terminal 1A transmits data to the other terminals 1 connected via the network by using the second radio communication unit 22. In this case, for example, the user operates the operation unit 12 on the GUI screen Gb shown in FIG. 9 to select and execute a "No. 12 machine" Cb, thereby enabling necessary data to be transmitted to the only terminal 1B.

In step ST8, whether a stop signal transmitted from the terminal 1B on the data reception side with which the data communication has completed is received by the first radio communication unit 21 or not is determined. In the case where the stop signal is received, the program advances to step ST9. In the case where the stop signal is not received, the program repeats step ST8.

In step ST9, like the step ST2, the second radio communication unit 22 and the like are set in the sleep mode and suspended. Specifically, when a stop signal (predetermined radio signal) transmitted from the first radio communication unit 21 of another terminal 1B is received by the first radio communication unit 21 of the terminal 1A, the end timing of the communication process period necessary for data communication is determined, and the second radio communication unit 22 is made inactive.

Next, the operations of the terminal 1B corresponding to the above-described operations of the terminal 1A will be described with reference to FIG. 7.

In steps ST11 and ST12, like the steps ST1 and ST2 in FIG. 6, the second radio communication unit 22 is initialized and, for power saving, the components of the terminal 1A including the second radio communication unit 22 and the CPU 13 are set in the sleep mode and suspended.

In step ST13, whether the activation signal (step ST5 in FIG. 6) transmitted from the terminal 1A on the data transmission side is received by the first radio communication unit 21 or not is determined. In the case where the activation signal is received, the program advances to step ST14. In the case where the activation signal is not received, the step ST13 is repeated.

In step ST14, the second radio communication unit 21 set in the sleep mode is activated by performing the resume process. Specifically, when an activation signal (predetermined radio signal) transmitted from the first radio communication unit 21 of another terminal 1A is received by the first radio communication unit 21, the start timing of the communication process period necessary for data communication is determined, and the second radio communication unit 22 is made active.

In step ST15, in correspondence with transmission/reception of the beacon signal in the terminal 1A on the data transmission side (step ST6 in FIG. 6), the terminal 1B on the data reception side also transmits/receives a beacon signal for establishing connection with the terminal 1A.

In step ST16, reception of the data transmitted from the terminal 1A on the data transmission side (step ST7 in FIG. 6) is started by using the second radio communication unit 22.

In step ST17, whether reception of data transmitted from the terminal 1A has completed or not is determined. In the case where reception of data has completed, the program advances to step ST18. In the case where the reception of data has not completed yet, the step ST17 is repeated.

In step ST18, by using the first radio communication unit 21, a stop signal (trigger signal) for making the second radio communication unit 22 in the terminal 1A on the data transmission side suspend is transmitted.

In step ST19, in a manner similar to step ST12, the second radio communication unit 22 is set in the sleep mode and suspended.

By the operation in the radio communication system 3, the second radio communication unit 22 can be activated only at the time of actual data communication using the wireless LAN. Consequently, transmission of the beacon signal from the second radio communication unit 22 is suppressed, and effective and proper power saving can be realized. As a result, the life of the internal power supply such as a battery loaded in the terminal 1A can be increased. By providing the first radio communication unit 21 in addition to the second radio communication unit 22, for example, without modifying the communication logic of the second radio communication unit 22 standardized in conformity with the IEEE 802.11 standard, power saving can be realized while maintaining the versatility.

Figure 10:
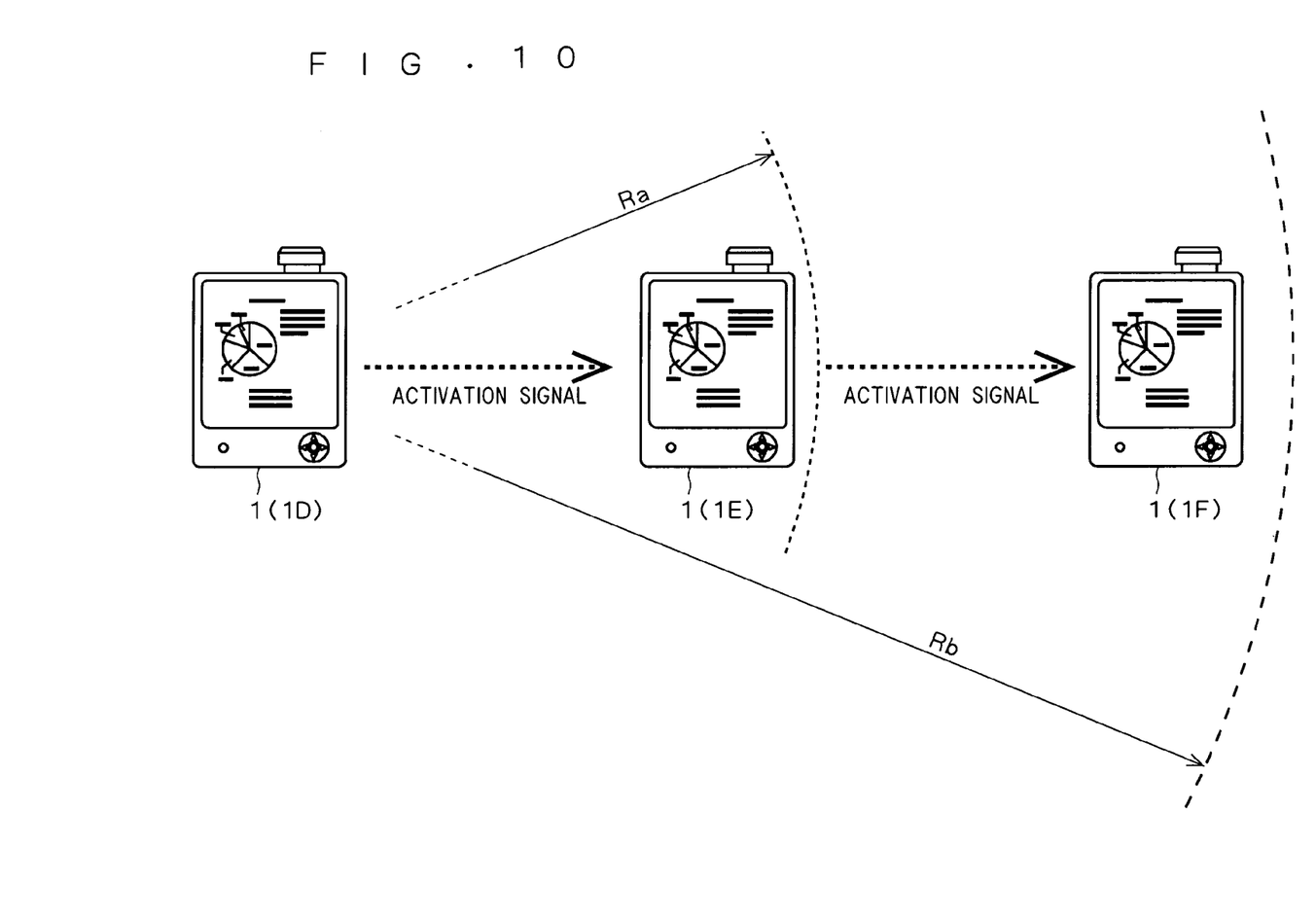
FIG. 10 is a diagram showing the operation of transmitting an activation signal to the next terminal.

As the operation of the terminal 1 in the radio communication system 3, the terminal 1 which receives the activation signal may transmit the activation signal to the terminals 1 in the periphery. In this case, for example, as shown in FIG. 10, the activation signal can be indirectly transmitted from a terminal 1D to a terminal 1F existing out of a communication range Ra of the first radio communication unit 11 of the terminal 1D but in a communication range Rb of the second radio communication unit 22 by using, as a radio repeater, a terminal 1E in an intermediate position between the terminals 1D and 1F. It enables data communication via the wireless LAN using the second radio communication unit 22 to be performed between the terminals 1D and 1F. That is, in the case where the activation signal transmitted from the first radio communication unit 21 of another terminal 1D is received by the first radio communication unit 21 of the terminal 1E positioned between the terminals 1D and 1F, by transmitting a radio signal (activation signal) corresponding to the received activation signal from the first radio communication unit 21 to another terminal 1F, the narrow communication range of the first radio communication unit 21 can be substantially extended. In the case where the second radio communication unit 22 of a terminal out of the communication range Rb of the second radio communication unit 22 is activated by relaying the activation signal from terminal to terminal, it cannot be connected to the network since the beacon signal cannot be transmitted/received.

Figure 11:
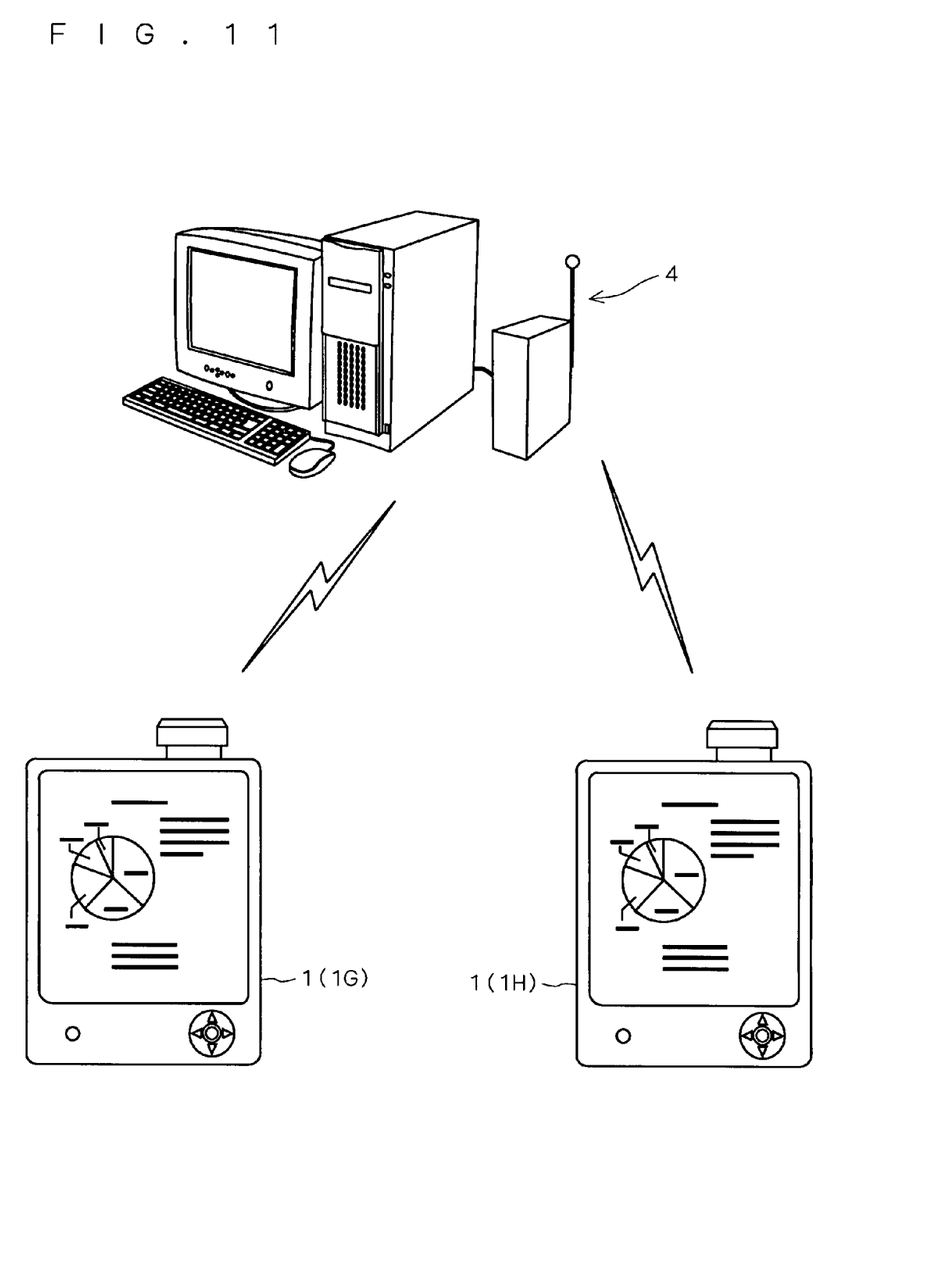
FIG. 11 is a diagram showing data communications in an infrastructure mode.

The terminal 1 can be also used in an infrastructure mode of performing data communications with a plurality of terminals 1G and 1H via an access point 4 shown in FIG. 11. To perform data communications in the infrastructure mode, for example, in the GUI screen Ga shown in FIG. 8, "Infra" is selected.

In the case of the radio communication in the infrastructure mode, the access point 4 periodically transmits the beacon signal for recognizing communicable terminals. Consequently, each of the terminals 1 basically does not transmit a beacon signal but simply receives the beacon signals from the access point 4. Therefore, the operation of the first radio communication unit 21 for suppressing transmission of the beacon signal from the terminal 1, that is the operation of transmitting/receiving the activation signal or the stop signal is not necessary in the infrastructure mode.

Modifications

The terminal 1 in the foregoing embodiment may have a measuring unit for measuring field intensity of a radio signal (the activation signal or stop signal) received by the first radio communication unit 21. By adjusting the intensity of an electric wave transmitted from the second radio communication unit in accordance with the intensity of a reception electric wave measured by the measuring unit, power can be saved also at the time of data communications.

The first radio communication unit 21 in the foregoing embodiment is not limited to a device conformed with ZigBee but a standardized radio communication device of a low power consumption type such as Bluetooth (trademark) may be employed. As the first radio communication unit 21, a device developed by a manufacture of a radio communication device on its own (for example, a device using radio waves of a frequency band having high directivity) or a device using infrared light used by a household remote controller or the like may be used.

With respect to transmission of a stop signal (step ST18 in FIG. 7) in the foregoing embodiment, it is not a must to send the stop signal by using the first radio communication unit 21. The stop signal may be transmitted by using the second radio communication unit 22 before entering the sleep mode.

The inactive state in the present invention includes not only the sleep mode (suspend mode) but also a stop state in which the initializing process or the like is necessary at the time of starting.

While the invention has been shown and described in detail, the foregoing description is in all aspects illustrative and not restrictive. It is therefore understood that numerous modifications and variations can be devised without departing from the scope of the invention.

What is claimed is:

1. An information terminal device having a display, comprising:

(a) a data communication unit capable of switching between an active state and an inactive state and performing radio data communication with another information terminal device;

(b) a low-power communication unit capable of performing radio communication with said another information terminal device with power consumption smaller than that of said data communication unit; and (c) a controller which sets said data communication unit to said inactive state except for a communication process period in which process necessary for said data communication is performed, start timing and/or end timing of said communication process period being able to be obtained by said low-power communication unit, wherein in the case where a predetermined radio signal transmitted from said low-power communication unit of said another information terminal device is received by said low-power communication unit, said controller determines that it is said start timing of said communication process period and sets said data communication unit to said active state.

2. An information terminal device having a display, comprising:

(a) a data communication unit capable of switching between an active state and an inactive state and performing radio data communication with another information terminal device;

(b) a low-power communication unit capable of performing radio communication with said another information terminal device with power consumption smaller than that of said data communication unit:

(c) a controller which sets said data communication unit to said inactive state except for a communication process period in which process necessary for said data communication is performed, start timing and/or end timing of said communication process period being able to be obtained by said low-power communication unit;

(d) a signal relay unit which, when a predetermined radio signal transmitted from said low-power communication unit of said another information terminal device is received by said low-power communication unit, transmits a radio signal corresponding to said predetermined radio signal from said low-power communication unit to another information terminal device.

3. An information terminal device having a display, comprising:

(a) a data communication unit capable of switching between an active state and an inactive state and performing radio data communication with another information terminal device;

(b) a low-power communication unit capable of performing radio communication with said another information terminal device with power consumption smaller than that of said data communication unit:

(c) a controller which sets said data communication unit to said inactive state except for a communication process period in which process necessary for said data communication is performed, start timing and/or end timing of said communication process period being able to be obtained by said low-power communication unit. wherein in the case where a specific radio signal transmitted from said low-power communication unit of said another information terminal device is received by said low-power communication unit, said controller determines that it is said end timing of said communication process period and sets said data communication unit to said inactive state.

4. An information terminal device having a display, comprising:

(a) a data communication unit capable of switching between an active state and an inactive state and performing radio data communication with another information terminal device;

(b) a low-power communication unit capable of performing radio communication with said another information terminal device with power consumption smaller than that of said data communication unit;

(c) a controller which sets said data communication unit to said inactive state except for a communication process period in which process necessary for said data communication is performed, start timing and/or end timing of said communication process period being able to be obtained by said low-power communication unit:

(d) an operation unit for accepting a predetermined operation; and (e) a unit for setting at least said data communication unit to said active state in response to said predetermined operation.

5. The information terminal device according to claim 1, wherein said low-power communication unit has a short-range radio device whose communicable range is narrower than that of said data communication unit.

6. The information terminal device according to claim 1, wherein said data communication unit has a wireless LAN device capable of performing radio communication at speed higher than said low-power communication unit.

7. The information terminal device according to claim 1, wherein said display is a display device having a memory characteristic.

8. The information terminal device according to claim 1, wherein said low-power communication unit is used only for an operation of obtaining a timing related to said communication process period.

9. A radio communication system capable of forming a radio network among a plurality of information terminal devices each having a display, each of said plurality of information terminal devices comprising:

a data communication unit capable of switching between an active state and an inactive state and performing radio data communication with another information terminal device;

a low-power communication unit capable of performing radio communication with said another information terminal device with power consumption smaller than that of said data communication unit;

a controller which sets said data communication unit to said inactive state except for a communication process period in which process necessary for said data communication is performed, start timing and/or end timing of said communication process period being able to be obtained by said low-power communication unit;

wherein said plurality of information terminal devices include a first information terminal device, a second information terminal device, and a third information terminal device positioned between said first information terminal device and said second information terminal device, and said third information terminal device has a signal relay unit which, when a predetermined radio signal transmitted from said low-power communication unit of said first information terminal device is received by said low-power communication unit, transmits a radio signal corresponding to said predetermined radio signal from said low-power communication unit to said second information terminal device.

10. The radio communication system according to claim 9, wherein said low-power communication unit is used only for an operation of obtaining a timing related to said communication process period.

11. A radio communication method using an information terminal device having a display, comprising the steps of:
- (a) performing radio data communication with another information terminal device by a data communication unit of said information terminal device capable of switching between an active state and an inactive state;
- (b) performing radio communication with said another information terminal device by a low-power communication unit of said information terminal device capable of performing radio communication with power consumption smaller than that of said data communication unit; and
- (c) performing a control for setting said data communication unit to said inactive state except for a communication process period in which process necessary for said data communication is performed, start timing and/or end timing of said communication process period being able to be obtained in the step (b), wherein in the case where a predetermined radio signal transmitted from said low-power communication unit of said another information terminal device is received by said low-power communication unit, it is determined as said start timing of said communication process period, and said data communication unit is set to said active state.

12. A radio communication method using an information terminal device having a display, comprising the steps of:
- (a) performing radio data communication with another information terminal device by a data communication unit of said information terminal device capable of switching between an active state and an inactive state;
- (b) performing radio communication with said another information terminal device by a low-power communication unit of said information terminal device capable of performing radio communication with power consumption smaller than that of said data communication unit;
- (c) performing a control for setting said data communication unit to said inactive state except for a communication process period in which process necessary for said data communication is performed, start timing and/or end timing of said communication process period being able to be obtained in the step (b); and
- (d) in the case where a predetermined radio signal transmitted from said low-power communication unit of said another information terminal device is received by said low-power communication unit, transmitting a radio signal corresponding to said predetermined radio signal from said low-power communication unit to another information terminal device.

13. A radio communication method using an information terminal device having a display, comprising the steps of:
- (a) performing radio data communication with another information terminal device by a data communication unit of said information terminal device capable of switching between an active state and an inactive state:
- (b) performing radio communication with said another information terminal device by a low-power communication unit of said information terminal device capable of performing radio communication with power consumption smaller than that of said data communication unit;
- (c) performing a control for setting said data communication unit to said inactive state except for a communication process period in which process necessary for said data communication is performed, start timing and/or end timing of said communication process period being able to be obtained in the step (b), in the case where a specific radio signal transmitted from said low-power communication unit of said another information terminal device is received by said low-power communication unit, it is determined as said end timing of said communication process period, and said data communication unit is set to said inactive state.

* * * * *